US012354583B2

(12) United States Patent
Reveron et al.

(10) Patent No.: US 12,354,583 B2
(45) Date of Patent: Jul. 8, 2025

(54) VOICE ISOLATION MASK APPARATUS

(71) Applicants: Eduardo Reveron, Viera, FL (US); Efrain Luis Reveron, Trujillo Alto, PR (US); Carlos Antonio Lugo, Davenport, FL (US)

(72) Inventors: Eduardo Reveron, Viera, FL (US); Efrain Luis Reveron, Trujillo Alto, PR (US); Carlos Antonio Lugo, Davenport, FL (US)

( * ) Notice: Subject to any disclaimer, the term of this patent is extended or adjusted under 35 U.S.C. 154(b) by 281 days.

(21) Appl. No.: 18/111,910

(22) Filed: Feb. 21, 2023

(65) Prior Publication Data

US 2024/0282285 A1 Aug. 22, 2024

(51) Int. Cl.
*G10K 11/162* (2006.01)
*A41D 13/11* (2006.01)

(52) U.S. Cl.
CPC ........ *G10K 11/162* (2013.01); *A41D 13/1161* (2013.01)

(58) Field of Classification Search
CPC .................................................... G10K 11/162
See application file for complete search history.

(56) References Cited

U.S. PATENT DOCUMENTS

| | | | | |
|---|---|---|---|---|
| 4,834,212 A * | 5/1989 | Figone | G10K 11/16 381/338 |
| 6,986,348 B2 * | 1/2006 | Carter | A41D 13/11 128/201.25 |
| 7,783,069 B1 * | 8/2010 | Miller | H04R 1/342 381/345 |
| 11,223,887 B1 * | 1/2022 | Webb | H04R 1/083 |
| 11,831,797 B2 * | 11/2023 | Anvari | H04M 1/19 |
| 2023/0372746 A1 * | 11/2023 | Lo | A62B 18/003 |

* cited by examiner

*Primary Examiner* — Forrest M Phillips

(57) ABSTRACT

The present disclosure provides a voice suppression mask apparatus which covers only the mouth of a wearer, forming a seal about the mouth to form a voice cavity and preventing the transmission of sounds between the voice cavity and the external environment of the wearer via a vacuum-sealed chamber. The mask apparatus further comprises an inlet passage with a port for a microphone tip, facilitating voice calls in privacy even in crowded environments, and preventing noisy environments from affecting the quality of audio captured by a wearer's microphone. The walls of the sealed chamber may also be transparent to facilitate video calls.

11 Claims, 6 Drawing Sheets

VOICE ISOLATION MASK APPARATUS

FIELD OF INVENTION

The present invention relates generally to a wearable mask for isolating the voice of a user. More specifically, the present invention relates to a voice isolation mask apparatus that suppresses sound wave transmission using a vacuum sealed chamber placed about the mouth of a user.

BACKGROUND

There are many situations in the modern day where a user may wish to take a phone call or video call, or even participate in a stream or conference, without their voice being audible in their surroundings, and without noisy environments such as public spaces interfering with the audio quality of their own voice as picked up by a microphone.

Voice isolation is beneficial for privacy reasons, allowing users to talk without fear of being overheard, and for more pragmatic reasons such as not wishing to disturb others in the user's environment. For example, a person playing games late at night may not wish to wake up their family members, or professionals needing to take calls while travelling without disturbing a quiet carriage or having confidential information overheard.

Noise suppression masks to address these issues have been proposed in the prior art, but most require integrated electronics to function, as they use active noise cancellation technology or require an integrated microphone of their own to ensure that a user's voice can actually be heard on their calls. This need for integrated electronics complicates the design of the masks and raises their price, as well as their risk of becoming faulty.

Furthermore, many prior art solutions form an isolated sound chamber that covers the nose of a user, restricting their breathing. This can be highly problematic for users with respiratory health conditions.

There is a need for a more cost-effective and pragmatic design of a voice isolation mask that does not interfere with a user's breathing and which maintains a high quality level of voice isolation. It is within this context that the present invention is provided.

SUMMARY

The present disclosure provides a voice suppression mask apparatus which covers only the mouth of a wearer, forming a seal about the mouth to form a voice cavity and preventing the transmission of sounds between the voice cavity and the external environment of the wearer via a vacuum-sealed chamber. The mask apparatus further comprises an inlet passage with a port for a microphone tip, facilitating voice calls in privacy even in crowded environments, and preventing noisy environments from affecting the quality of audio captured by a wearer's microphone. The walls of the sealed chamber may also be transparent to facilitate video calls.

According to a first aspect of the present disclosure, there is provided a voice isolation mask apparatus, comprising: a sealed chamber comprising an inner wall and an outer wall, the interior of the chamber comprising a vacuum, and an exterior surface of the inner wall defining a voice cavity; and a sealing element encompassing the voice cavity formed by the inner wall of the sealed chamber, the sealing element and voice cavity together being configured to conform about the mouth of a person while leaving the nose uncovered.

The mask apparatus further comprises a voice conduit extending from the voice cavity to the exterior wall of the sealed chamber, the voice conduit comprising a valve-controlled port opening configured to receive a microphone tip; and a fastening mechanism for securing the sealed chamber and sealing element in place over the mouth.

In some embodiments, the inner wall and the outer wall of the sealed chamber are formed of a transparent material. The material may be a rigid plastic, for example.

In such embodiments, the apparatus may further comprise an opaque cover configured to detachably couple to the mask over the outer wall of the sealed chamber. This detachable cover may comprise a personalized design on its exterior surface.

In some embodiments, the sealing element is a silicone strip adhered about the circumference of the edges of the voice cavity.

In some embodiments, the inner wall and the outer wall of the sealed chamber are bonded together to form a vacuum sealed chamber via ultrasonic welding process.

In some embodiments, the fastening mechanism is an adjustable strap configured to loop around the rear of the head. The strap may be fitted with a center buckle as a latch system for fastening or a magnetic button for fastening.

In yet further embodiments, the mask apparatus further comprises an adapter attachment configured to couple to the exterior port opening of the voice conduit, the adapter attachment forming an open-ended tunnel between the port opening and the ear of a wearer.

BRIEF DESCRIPTION OF THE DRAWINGS

Various embodiments of the invention are disclosed in the following detailed description and accompanying drawings.

Figure 1A:
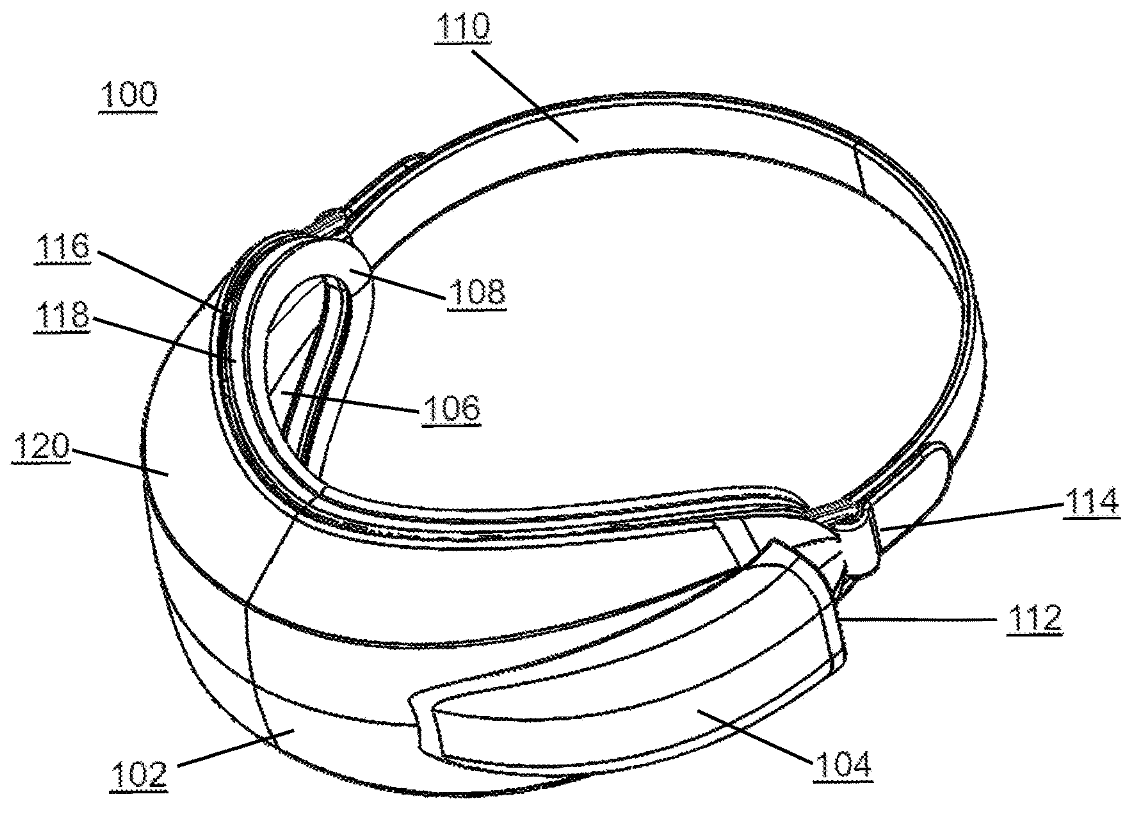
FIG. 1A illustrates an isometric perspective view of an example configuration of a voice isolation mask apparatus according to the present disclosure with an opaque cover attached over the exterior.
Figure 1B:
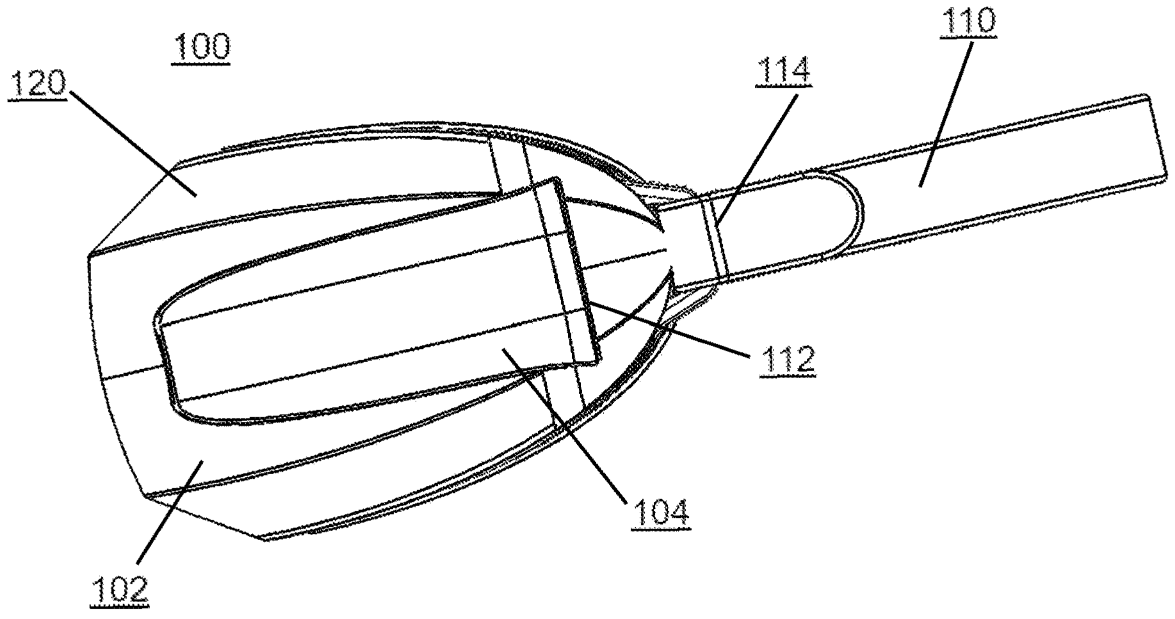
FIG. 1B illustrates an isometric side view of the example mask apparatus configuration.
Figure 1C:
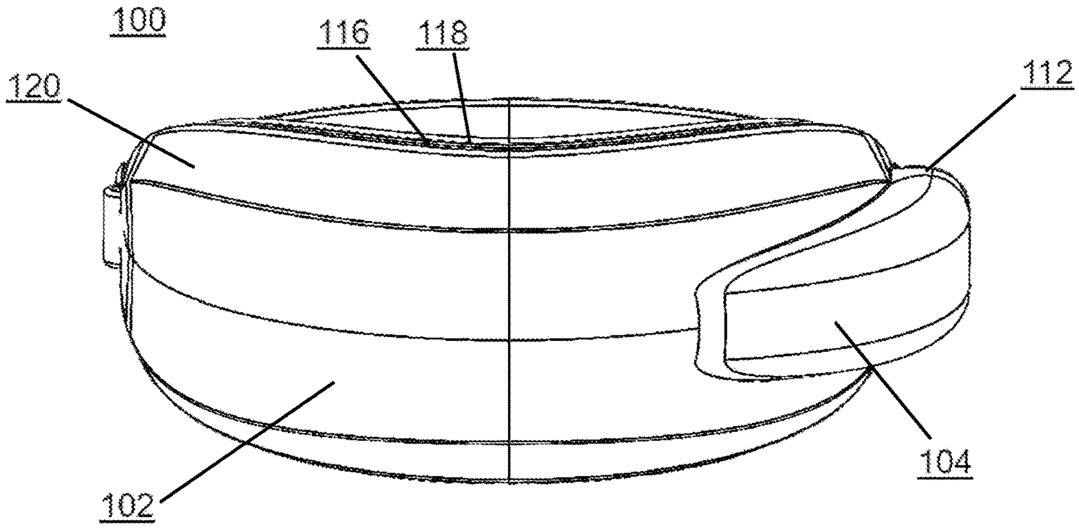
FIG. 1C illustrates an isometric front view of the example mask apparatus configuration.
Figure 1D:
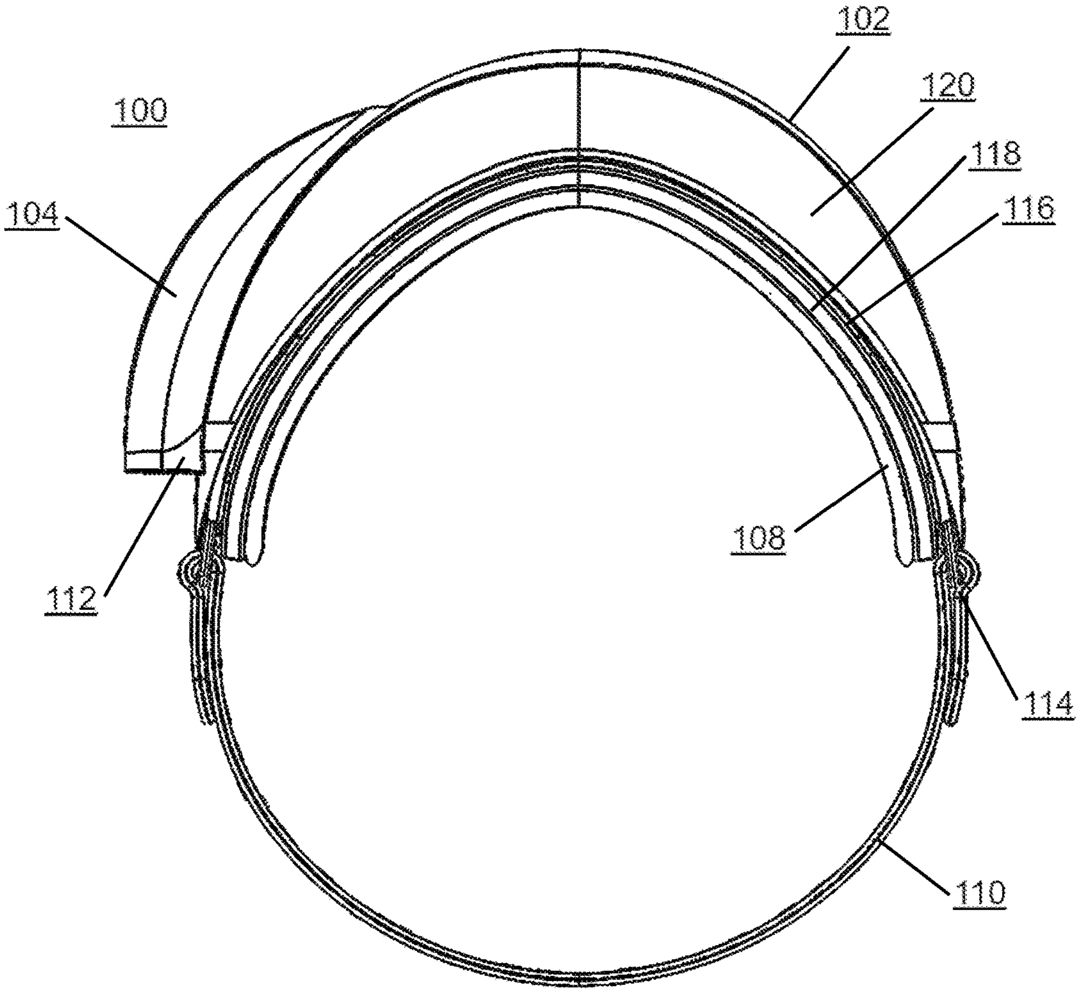
FIG. 1D illustrates an isometric top view of the example mask apparatus configuration.
Figure 1E:
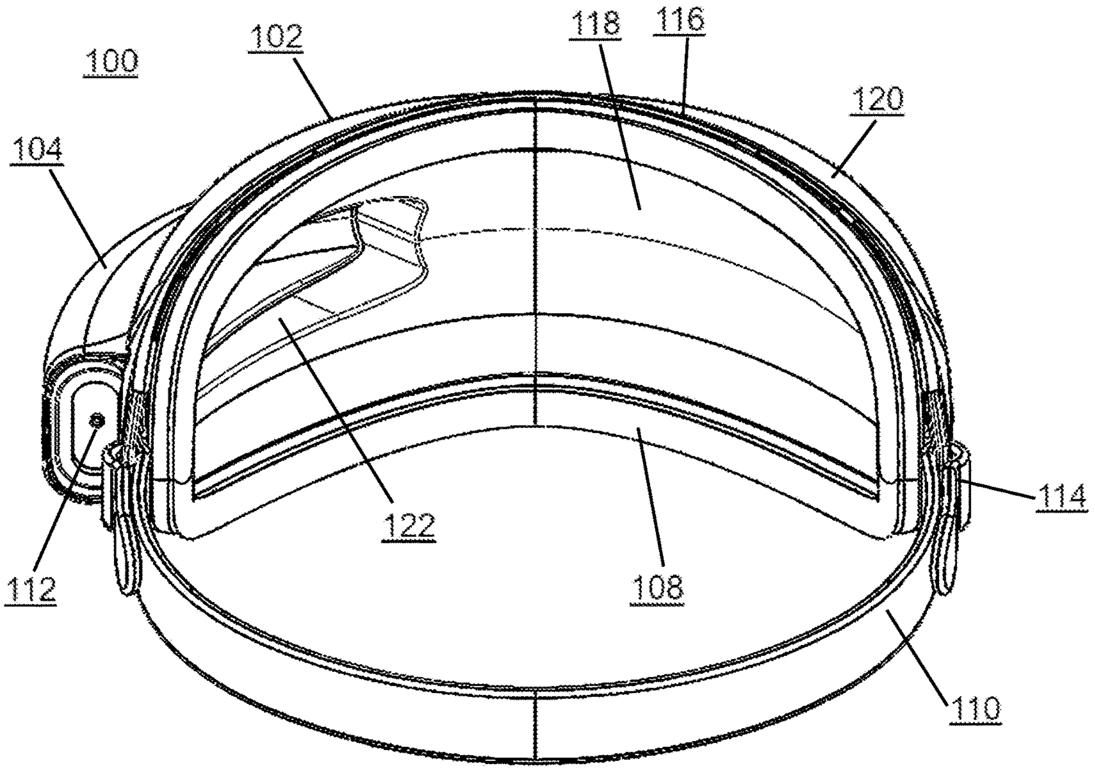
FIG. 1E illustrates an isometric rear view of the example mask apparatus configuration.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Definitions

The terminology used herein is for the purpose of describing particular embodiments only and is not intended to be limiting of the invention. As used herein, the term "and/or" includes any combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The terminology used herein is for the purpose of describing particular embodiments only and is not intended to be limiting. As used herein, the singular forms "a," "an" and "the" are intended to include the plural forms as well, unless the context clearly indicates otherwise.

The terms "first," "second," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Referring to FIG. 1A-1E, various isometric views are shown of an example configuration of a voice isolation mask apparatus 100 according to the present disclosure with an opaque cover 120 attached over the exterior.

As can be seen, the mask 100 has a body 102 shaped to form a voice cavity 106 over the mouth of the wearer but to leave the nose uncovered. This allows for highly efficient voice suppression without interfering with the user's breathing, which can be a problematic element for many users, especially those with respiratory health conditions such as asthma.

The body 102 is formed of an inner wall 118 and an outer wall 116, which together form a vacuum sealed chamber with negative internal pressure which completely prevents the transmission of sound through the chamber. The chamber is formed in an oblong shape with the concave voice cavity 106 formed by the exterior surface of the inner wall 118. In other words, it is configured to conform to the shape of a human face, about the mouth.

The circumference of this voice cavity 106 is surrounded by a sealing element which in the present example is a silicone strip or cushion 108, which is in turn configured to form a seal between the edges of the sealed chamber and the skin of a user's face when worn, effectively reducing transmission of sounds between the voice cavity and the exterior environment and isolating the voice of a user so that they can speak without being heard by those around them and so that sounds form noisy environments are suppressed within the voice cavity also.

The mask 100 also has an inlet 104 that allows the passage of a user's microphone tip into the voice cavity. The inlet 104 comprises a one-way valve 112 for allowing the microphone tip inside with minimal accompanying sound transmission. For example, it could be formed of a soft elastic material that conforms to the microphone tip to prevent air from travelling in or out around it. There is also an inner chamber cavity 122 formed to provide enough space to receive the microphone tip.

In some embodiments the inner wall 118 and outer wall 116 of the sealed chamber are both transparent or at least partially transparent, facilitating the mouth of a user to be seen through the mask while keeping their voice isolated. This is beneficial for video calls and could be useful for professionals, streamers, and gamers alike.

In some cases, a user may wish to switch between their mouth being visible and being covered, thus an opaque exterior cover 120 is provided that can be detachably coupled to the exterior wall of the sealed chamber. This detachable cover 120 may comprise a personalized design on it according to a user's preference.

Various means can be used for securing the mask firmly in place over a user's mouth. In this particular example the mask is secured by an adjustable strap that tightens about the back of the wearer's head. The strap may be fitted with a center buckle as a latch system for fastening or a magnetic button for fastening, or any other suitable fastening mechanism.

In some embodiments, the inner wall and the outer wall of the sealed chamber are bonded together to form a vacuum sealed chamber via ultrasonic welding process.

Figure 2A:
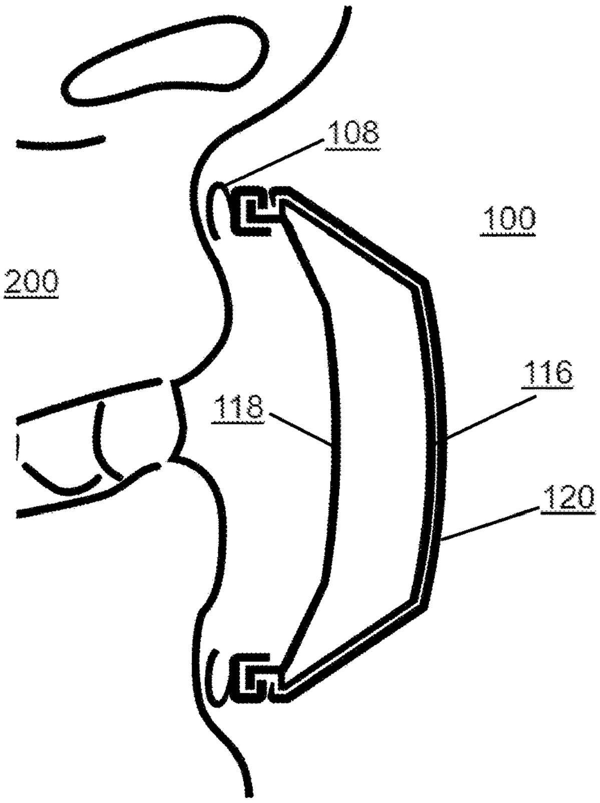
FIG. 2A illustrates a cross-sectional view of the example mask configuration worn as intended over the mouth of a user.

FIG. 2A-FIG. 2D show various cross-sectional views of the example mask apparatus 100. FIG. 2A shows the mask 100 worn as intended over the mouth of a user 200, leaving their nose uncovered.

Figure 2B:
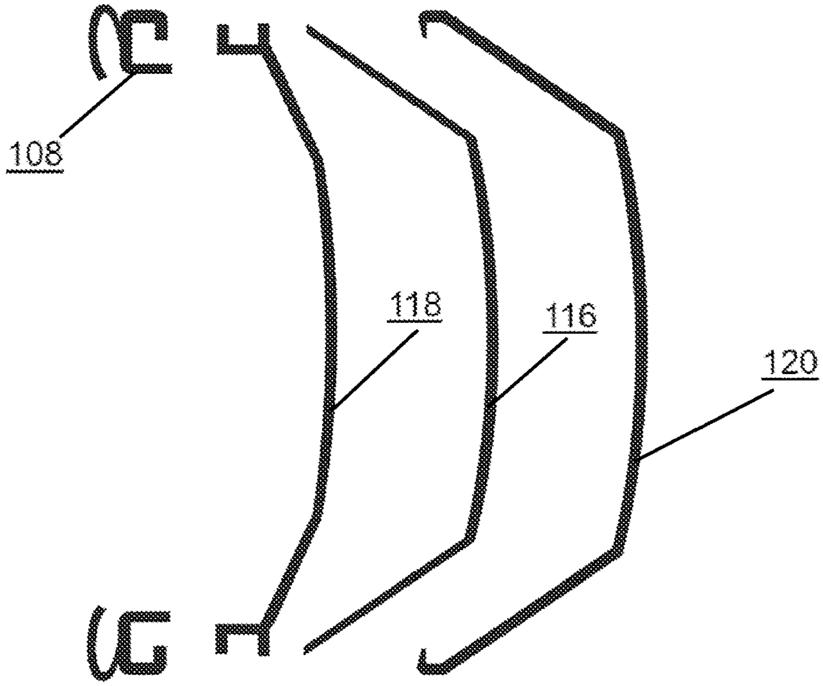
FIG. 2B illustrates a cross-sectional components view of the different layers of the example mask configuration.

FIG. 2B shows the different layers of the example mask configuration. The inner wall 118 and outer wall 116 of the sealed chamber may be bonded together by an ultrasonic welding process.

Figure 2C:
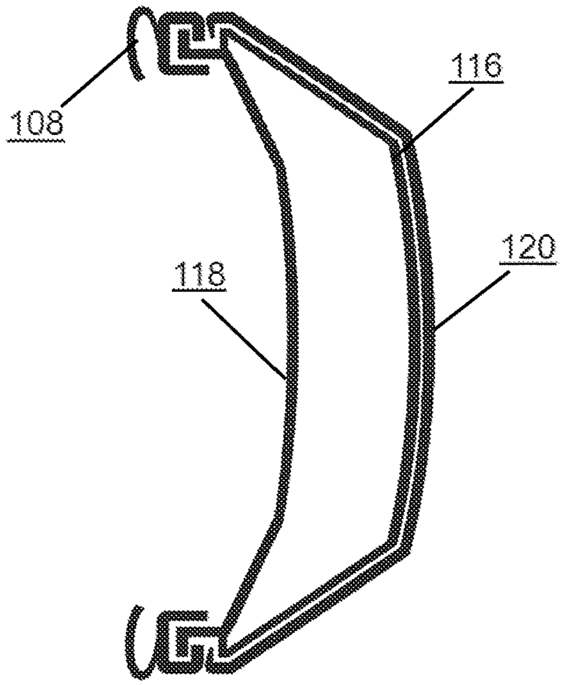
FIG. 2C illustrates a cross-sectional view of the assembled mask configuration with the detachable cover installed over the exterior wall of the sealed chamber.
Figure 2D:
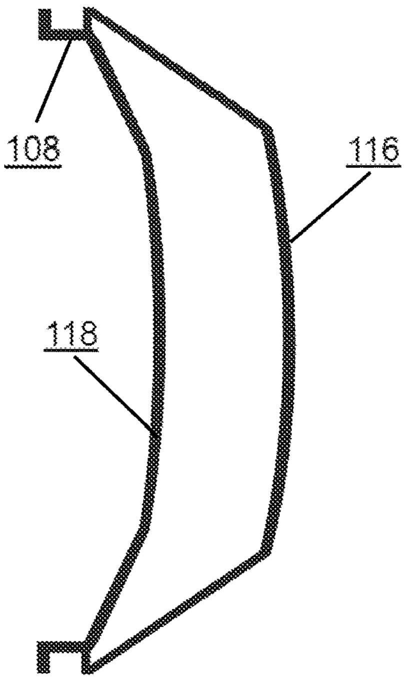
FIG. 2D illustrates a cross-sectional view of the assembled mask configuration with no detachable cover.

FIG. 2C and FIG. 2D show the assembled mask configuration with (FIG. 2C) and without (FIG. 2D) the detachable cover 120 installed over the exterior wall of the sealed chamber.

The mask 100 of the present disclosure provides a number of advantages over prior art solutions, allowing user's to talk in privacy and with clarity without obstructing their nasal airways, and allowing a user to participate in calls in public spaces. It does not require an integrated microphone for such applications, and can instead operate in conjunction with any headset microphone the user already possesses.

Furthermore, the simplicity of the design and the low cost of the materials facilitates a highly cost effective manufacturing process, enabling such apparatus to be provided to users at an affordable price range.

It should also be noted that this device can be used with ear bud type microphones or headsets without long microphones through the inclusion of a specialized adapter to provide a conduit between those microphones and the space inside the mask.

Figure 3A:
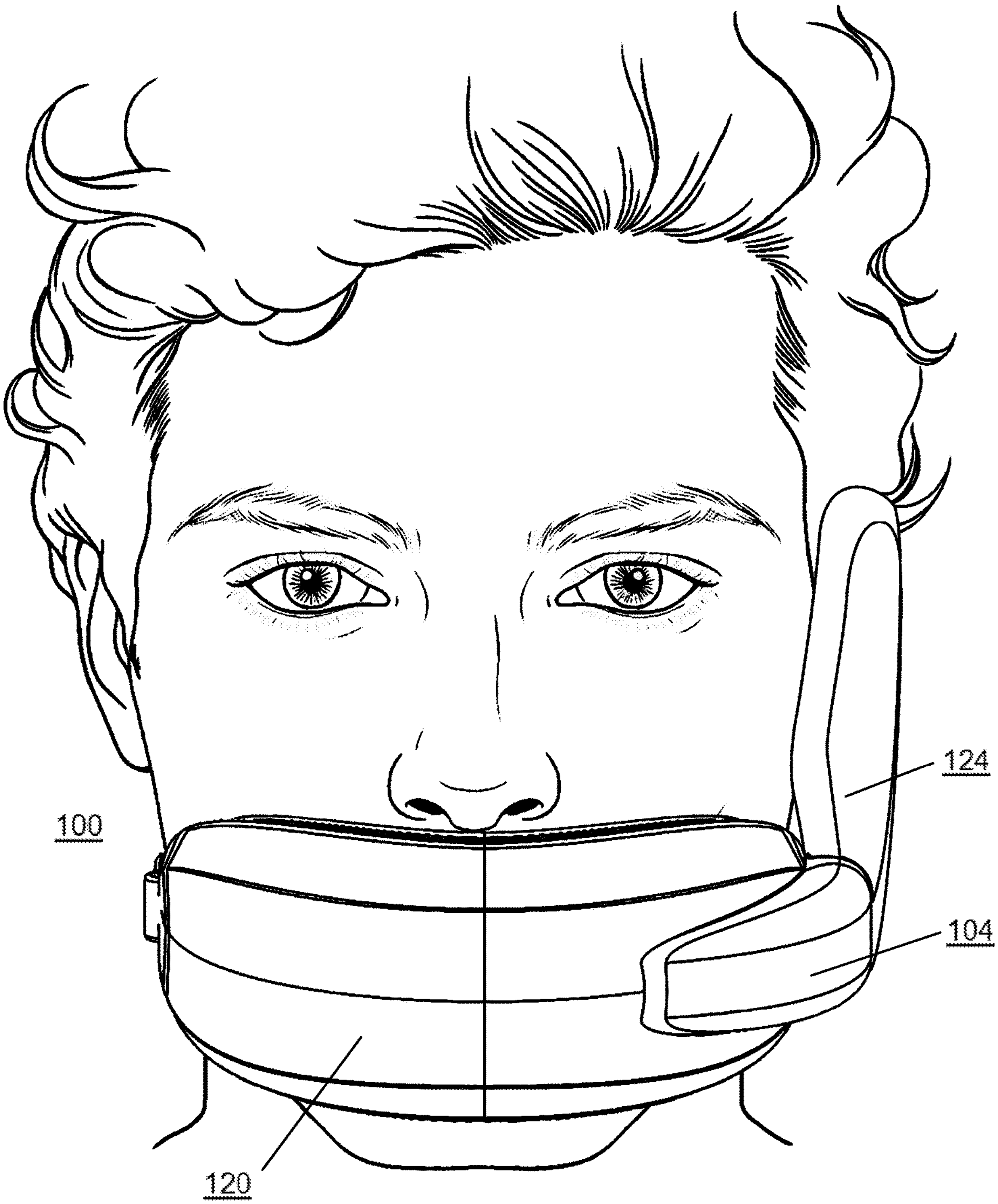
FIG. 3A illustrates an isometric front view of a user wearing the example mask apparatus with a specialized adapter attachment installed for improved functionality with earbud microphones.
Figure 3B:
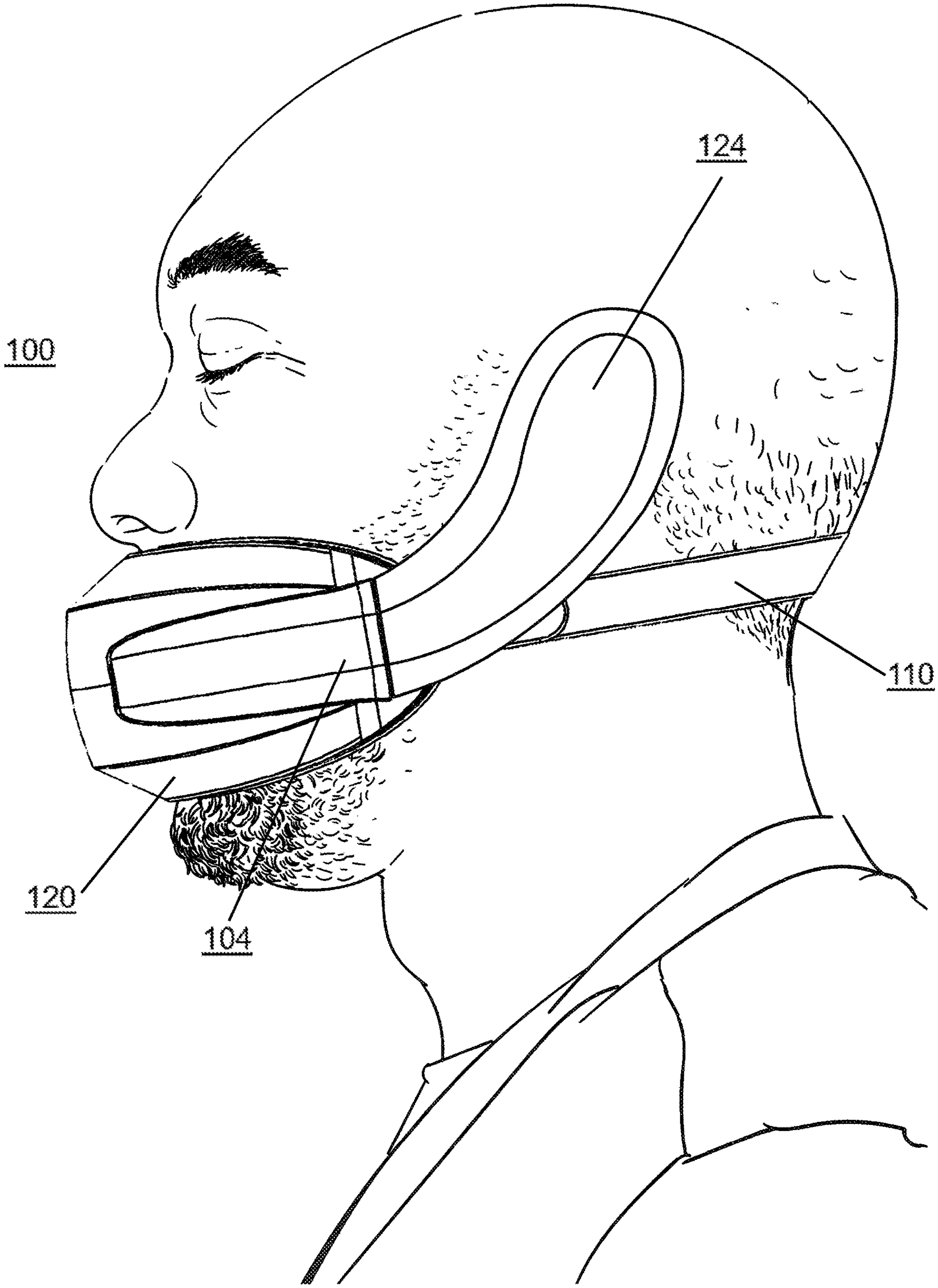
FIG. 3B illustrates an isometric side view of a user wearing the example mask apparatus with the adapter attachment installed.

Referring to FIG. 3A and FIG. 3B, isometric front and side views are shown of different users wearing the example mask apparatus 100 with an example specialized adapter attachment 124 installed for improved functionality with earbud microphones and headsets.

As can be seen, the adapter attachment 124 of the present example is a simple cover extension that forms an open ended-tunnel shape, extending the air pathway from the inlet 104 of the outer cover to the user's ear. The adapter 124 may comprise a connector configured to pierce through valve 112 so that sound can effectively travel between the wearer's mouth and the microphone positioned at the ear.

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the mask apparatus have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A voice isolation mask apparatus, comprising:

a sealed chamber comprising an inner wall and an outer wall, the interior of the chamber comprising a vacuum, and an exterior surface of the inner wall defining a voice cavity;

a sealing element encompassing the voice cavity formed by the inner wall of the sealed chamber, the sealing element and voice cavity together being configured to conform about the mouth of a person while leaving the nose uncovered;

a voice conduit extending from the voice cavity to the exterior wall of the sealed chamber, the voice conduit comprising a valve-controlled port opening configured to receive a microphone tip; and a fastening mechanism for securing the sealed chamber and sealing element in place over the mouth.

2. A voice isolation mask apparatus according to claim 1, wherein the inner wall and the outer wall of the sealed chamber are formed of a transparent material.

3. A voice isolation mask apparatus according to claim 2, wherein the material is a rigid plastic.

4. A voice isolation mask apparatus according to claim 2, wherein the apparatus further comprises an opaque cover configured to detachably couple to the mask over the outer wall of the sealed chamber.

5. A voice isolation mask apparatus according to claim 4, wherein the detachable cover comprises a personalised design on its exterior surface.

6. A voice isolation mask apparatus according to claim 1, wherein the sealing element is a silicone strip adhered about the circumference of the edges of the voice cavity.

7. A voice isolation mask apparatus according to claim 1, wherein the inner wall and the outer wall of the sealed chamber are bonded together to form a vacuum sealed chamber via ultrasonic welding process.

8. A voice isolation mask apparatus according to claim 1, wherein the fastening mechanism is an adjustable strap configured to loop around the rear of the head.

9. A voice isolation mask apparatus according to claim 8, wherein the strap is fitted with a centre buckle as a latch system for fastening.

10. A voice isolation mask apparatus according to claim 8, wherein the strap is fitted with a magnetic button for fastening.

11. A voice isolation mask apparatus according to claim 1, further comprising an adapter attachment configured to couple to the exterior port opening of the voice conduit, the adapter attachment forming an open-ended tunnel between the port opening and the ear of a wearer.

* * * * *